United States Patent
Kaplan et al.

(10) Patent No.: US 10,169,244 B2
(45) Date of Patent: Jan. 1, 2019

(54) CONTROLLING ACCESS TO PAGES IN A MEMORY IN A COMPUTING DEVICE

(71) Applicant: Advanced Micro Devices, Inc., Sunnyvale, CA (US)

(72) Inventors: David A. Kaplan, Austin, TX (US); Jeremy W. Powell, Austin, TX (US); Thomas R. Woller, Austin, TX (US)

(73) Assignee: ADVANCED MICRO DEVICES, INC., Santa Clara, CA (US)

(*) Notice: Subject to any disclaimer, the term of this patent is extended or adjusted under 35 U.S.C. 154(b) by 39 days.

(21) Appl. No.: 15/224,302

(22) Filed: Jul. 29, 2016

(65) Prior Publication Data
US 2018/0032443 A1  Feb. 1, 2018

(51) Int. Cl.
| G06F 12/10 | (2016.01) |
| G06F 12/1027 | (2016.01) |
| G06F 12/1009 | (2016.01) |
| G06F 9/455 | (2018.01) |

(52) U.S. Cl.
CPC ...... *G06F 12/1027* (2013.01); *G06F 9/45558* (2013.01); *G06F 12/1009* (2013.01); *G06F 2009/45583* (2013.01); *G06F 2212/657* (2013.01); *G06F 2212/68* (2013.01)

(58) Field of Classification Search
CPC ....... G06F 9/45558; G06F 2009/45583; G06F 12/1009; G06F 12/1027; G06F 2212/657; G06F 2212/68
USPC .......................................................... 711/6
See application file for complete search history.

(56) References Cited

U.S. PATENT DOCUMENTS

| 2010/0223447 A1* | 9/2010 | Serebrin ............. G06F 12/0253 712/225 |
| 2011/0131388 A1 | 6/2011 | Chen et al. |
| 2013/0191611 A1 | 7/2013 | Liu et al. |
| 2015/0100717 A1 | 4/2015 | Bennett et al. |
| 2015/0378633 A1 | 12/2015 | Sahita et al. |
| 2016/0110291 A1 | 4/2016 | Gordon et al. |
| 2016/0378678 A1* | 12/2016 | Lemay ................ G06F 12/1009 711/163 |

* cited by examiner

Primary Examiner — Hua J Song
(74) Attorney, Agent, or Firm — Park, Vaughan, Fleming & Dowler LLP

(57) ABSTRACT

The described embodiments perform a method for handling memory accesses by virtual machines in a computing device. The described embodiments include a reverse map table (RMT) and a separate guest accessed pages table (GAPT) for each virtual machine. The RMT has a plurality of entries, each entry including information for identifying a virtual machine that is permitted to access an associated page of data in a memory. Each GAPT has a record of pages being accessed by a corresponding virtual machine. During operation, a table walker receives a request from a given virtual machine to translate a guest physical address to a system physical address. The table walker checks at least one of the RMT and a corresponding GAPT to determine whether the given virtual machine has access to a corresponding page. If not, the table walker terminates the translating. Otherwise, the table walker completes the translating.

19 Claims, 7 Drawing Sheets

| ENTRY 400 | GSP 402 | GUEST ID 404 | GUEST PHY ADDR 406 | SUB-PAGE COUNT 408 | ACCESS 410 | SIZE 412 | VALID 414 |
|---|---|---|---|---|---|---|---|
| REVERSE MAP TABLE 228 | GSP 402 | GUEST ID 404 | GUEST PHY ADDR 406 | SUB-PAGE COUNT 408 | ACCESS 410 | SIZE 412 | VALID 414 |
| | ⋮ | | | | | | |
| | GSP 402 | GUEST ID 404 | GUEST PHY ADDR 406 | SUB-PAGE COUNT 408 | ACCESS 410 | SIZE 412 | VALID 414 |

CONTROLLING ACCESS TO PAGES IN A MEMORY IN A COMPUTING DEVICE

BACKGROUND

Related Art

Some computing devices execute virtual machines, which are software entities that emulate or otherwise interface with the hardware of the computing devices in order to provide support for executing software programs. For example, a virtual machine may use hardware elements in a computing device (processors, memories, network interfaces, etc.) to provide support for running one or more instances of operating systems, called "guest" operating systems. The guest operating systems in turn provide support for executing other software programs such as applications, databases, etc.

Some of the computing devices execute two or more virtual machines concurrently (e.g., in corresponding time slices, in parallel on one or more processor cores, etc.). In such computing devices, each virtual machine may have access to hardware resources that are allocated exclusively for the use of the virtual machine. For example, each virtual machine may be allocated a corresponding region of a memory in a computing device for the exclusive use of the virtual machine. In these computing devices, a first virtual machine may be prevented from accessing a region of memory allocated to a second virtual machine and vice versa. In some of these computing devices, a hypervisor enforces access controls for each virtual machine. Hypervisors are software entities that operate/execute on computing devices and function as a manager or controller for virtual machines executing on the computing device. For example, hypervisors may start or initialize virtual machines, control accesses of computing device hardware by virtual machines, terminate or close virtual machines, etc.

Although hypervisors are assumed to provide access controls for virtual machines, a hypervisor may not always properly enforce the access controls. For example, some or all of the program code for a hypervisor may be replaced with malicious program code, a hypervisor's program code may become corrupted or include an error, etc. In such cases, a hypervisor may deliberately or unintentionally allow a virtual machine to access computing hardware allocated to another virtual machine. For example, in some computing devices, a hypervisor is responsible for providing address information to enable virtual machines to access data in corresponding areas of memory. In these computing devices, the hypervisor provides translations between local addresses used by virtual machines (or software executing thereon) and the physical addresses where data is actually located in memory. When the hypervisor is not functioning correctly, the hypervisor may provide incorrect address information, thereby directing virtual machines to access data in unexpected or unwanted areas of memory (e.g., areas of memory allocated to other virtual machines). By providing incorrect address information as described, a hypervisor can cause data to be accessed in violation of one or more access controls or rules.

BRIEF DESCRIPTION OF THE FIGURES

Throughout the figures and the description, like reference numerals refer to the same figure elements.

DETAILED DESCRIPTION

Figure 1:
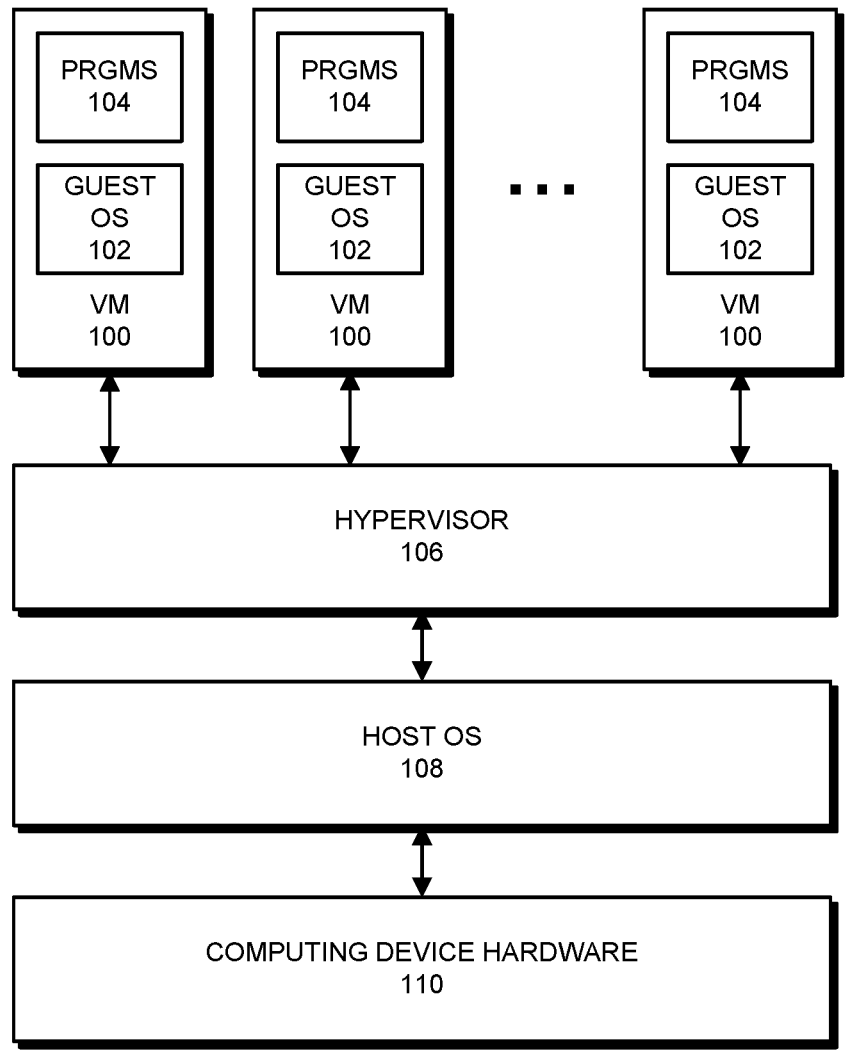
FIG. 1 presents a block diagram illustrating virtual machines and a hypervisor in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications. Thus, the described embodiments are not limited to the embodiments shown, but are to be accorded the widest scope consistent with the principles and features disclosed herein.

Virtual Memory

In the described embodiments, a computing device uses a virtual memory technique for handling data accesses by programs being executed in the computing device. For example, the programs may include applications, operating systems, device drivers, virtual machines, software executed by peripherals, etc. Generally, when data is accessed by a program in the computing device, a block or "page" of memory of a given size (e.g., 4 kB, 2 MB, etc.) that includes the data is copied from mass storage (e.g., a disk drive or semiconductor memory) to an available physical location in a memory in the computing device or is newly created in the memory. In order to avoid programs being required to keep track of the physical locations of pages in memory, the computing device keeps track of the physical locations of the pages for the programs. The programs access memory using "virtual addresses" in "virtual address spaces," which are local address spaces that are specific to corresponding programs, instead of accessing memory using addresses based on the physical locations of pages (or "physical addresses"). From a program's perspective, virtual addresses indicate the actual physical locations where data is stored in memory, and memory accesses are made by programs using the virtual addresses accordingly. The virtual addresses, however, may not map directly to the physical addresses of the physical locations where data is stored in pages in the memory. As part of keeping track the physical locations of pages, the computing device translates the virtual addresses used by the programs in memory access requests into the physical addresses where the data is actually located. The computing device then uses the physical addresses to perform the memory accesses for the programs.

In order to enable the above-described virtual address to physical address translations, the computing device includes a "page table." The page table is a record stored in a memory of the computing device that includes an entry, or a "page table entry," with virtual address to physical address translation information for pages of data that are stored in the memory. In other words, the page table includes "mappings" of virtual addresses to corresponding physical addresses. Upon receiving a request from a program to access memory at a given virtual address, the computing device acquires corresponding physical address information from the page table by performing a "page table walk," during which the page table is searched for a page table entry that provides the physical address associated with the virtual address.

Because the above-described page table walks are relatively slow, it is desirable to avoid performing page table walks. The computing device therefore includes translation lookaside buffers ("TLBs"), which are local caches that are used for storing a limited number of copies of page table entries acquired during page table walks (or information based on page table entries). During operation, the computing device first attempts to acquire cached page table entries from the corresponding TLB for performing virtual address to physical address translations. When the copy of the corresponding page table entry is not present in the TLB (i.e., when a "miss" occurs), the computing device performs a page table walk to acquire the desired page table entry— and caches a copy of the acquired page table entry in the TLB.

Virtual Machines, Hypervisors, and Hierarchical Page Tables

In the described embodiments, a computing device executes virtual machines, which are software entities that emulate or otherwise interface with the hardware of the computing devices in order to provide support for executing software programs. For example, a virtual machine may use hardware elements in a computing device (processors, memories, network interfaces, etc.) to provide support for running one or more instances of operating systems, called "guest" operating systems. The guest operating systems in turn provide support for executing other software programs such as applications, databases, etc.

In the described embodiments, the computing device may execute two or more virtual machines concurrently (e.g., in corresponding time slices, in parallel on one or more processor cores, etc.). In these embodiments, each virtual machine may be associated with various hardware resources that are allocated for the virtual machine's use. For example, each virtual machine may be provided with exclusive access to allocated region(s) of memory (e.g., contiguous or non-contiguous blocks of memory). In other words, a first virtual machine may be prevented from accessing pages of data in regions of memory associated with a second virtual machine and vice versa. In the described embodiments, a hypervisor enforces access controls for each virtual machine. A hypervisor is a software entity that operates or executes on the computing device and functions as a manager or controller for the virtual machines executing on the computing device. For example, the hypervisor may start or initialize virtual machines, control accesses of computing device hardware by virtual machines, terminate or close virtual machines, etc.

FIG. 1 presents a block diagram illustrating virtual machines and a hypervisor in accordance with some embodiments. As can be seen in FIG. 1, there are three virtual machines ("VM") 100, each of which executes a guest operating system ("GUEST OS") 102 and one or more programs ("PRGRMS") 104, such as databases, software applications, etc. The virtual machines 100 communicate with a hypervisor 106, which interfaces between a host operating system ("HOST OS") 108 and the virtual machines 100. Host operating system 108 provides an interface between computing device hardware 110 and hypervisor 106. Although various elements are presented in FIG. 1, in some embodiments, different arrangements of elements are present. For example, in some embodiments, host operating system 108 is not present and hypervisor 106 communicates more directly with computing device hardware 110. As another example, a different number of virtual machines 100 may be present.

In the described embodiments, both the guest operating systems and the hypervisor use the above-described virtual memory technique. A hierarchy of page tables is therefore maintained in the computing device. Within the hierarchy of page tables, each guest operating system is associated with a local page table (a guest page table) and the hypervisor is associated with a nested page table. Generally, upon receiving a request from a processor for a translation from a virtual address used by a program executing under a guest operating system to a system physical address, a hardware table walker (i.e., a circuit configured to perform page table walks) uses the guest page table and the nested page table to perform the translation. More specifically, the table walker uses the guest page table to translate the virtual address used by the program into a guest physical address, which is an address that is local to the guest operating system. Because the guest physical address may not map directly to a location in memory where data (or an instruction, etc.) to be accessed by the program is stored, the table walker uses the nested page table to translate the guest physical address into a system physical address, which is an address that indicates the actual location in memory where the data is stored. Upon acquiring the system physical address, the table walker provides the system physical address for use in accessing the data, and may also cache the system physical address in a TLB.

In the described embodiments, the hypervisor can perform various operations on information in the nested page table. For example, hypervisor can update (i.e., overwrite) mappings from guest physical addresses to system physical addresses, etc. As described below, the described embodiments perform operations to ensure that information in the nested page table has not been changed by the hypervisor (maliciously, erroneously, etc.) in such a way that incorrect mappings/translations are provided by the hypervisor.

Overview

The described embodiments include mechanisms for controlling access by virtual machines to pages in a memory in a computing device. More specifically, the described embodiments include a pair of tables that are used to ensure that, among other things, a hypervisor (and/or another entity in the computing device) has not remapped translations from guest physical addresses to system physical addresses in the nested page table. The pair of tables includes: (1) a reverse map table and (2) a guest accessed pages table. The reverse map table includes information that can be used to determine, among other things, whether a system physical address acquired during a table walk of a nested page table for a guest physical address matches a previously-used system physical address. In other words, the reverse map table can be used to ensure that a system physical address for a given page in memory matches to only one guest physical address at a time. The guest accessed pages table includes information that can be used to determine whether a virtual machine is recorded as having previously accessed pages in a region of memory.

In some embodiments, when translating a guest physical address into a system physical address (e.g., based on a request from a load/store unit in a processor on behalf of a corresponding virtual machine), a hardware table walker (e.g., in a memory management unit) performs a table walk of the nested page table to acquire, from a corresponding entry in the nested page table, the system physical address. It is unknown whether the nested page table, and thus the corresponding entry, has been modified and so it is unknown whether the mapping/translation in the corresponding entry violates corresponding rules (e.g., that a corresponding page has been associated with multiple guest physical addresses, etc.). For this reason, the table walker, upon acquiring a system physical address from the nested page table, checks at least one of the reverse map table and a corresponding guest accessed pages table to determine whether the virtual machine has access to a corresponding page in memory in the computing device. More specifically, the table walker checks the reverse map table to ensure that, among other things, an entry corresponding to the system physical address is valid and has a recorded guest physical address that matches the guest physical address from the request. When this is true, it can be determined that the system physical address matches the guest physical address (i.e., that the system physical address maps only to the guest physical address). The table walker then checks page-accessed information in the entry in the reverse map table to determine if the page-accessed information indicates that the virtual machine has already accessed the page of memory. If so, the table walker returns the system physical address to the load/store unit. Otherwise, when page-accessed information indicates that the virtual machine has not yet accessed the page of memory, the table walker performs a lookup in the guest accessed pages table to determine if page-access information in the guest accessed pages table matches (i.e., indicates that there has been no access). When either the check in the reverse map table or the check in the guest accessed pages table returns a mismatch, the table walker fails the translation and may return an error message to the hypervisor. Upon receiving the error, the hypervisor can perform a remedial action (e.g., execute error handling code, fault, etc.). In contrast, when the check in the reverse map table and the guest accessed pages table both return a match, the table walker returns the system physical address to the load/store unit, enabling the load/store unit to perform memory accesses using the system physical address (and possibly to cache the system physical address and/or other information from the table walk in a TLB, etc.).

By using the reverse map table and the guest accessed pages table, the described embodiments enable the detection of potentially malicious or erroneous modifications of the nested page table. Avoiding such modifications of the nested page table can improve the security of data for virtual machines in the computing device by avoiding the hypervisor (and/or another entity) improperly remapping guest physical addresses to system physical addresses to direct virtual machines to access (e.g., overwrite, execute, etc.) data in unknown, unwanted, or incorrect areas of memory (including areas of memory allocated to other virtual machines). In other words, the described embodiments can improve security of data by enforcing rules such as: each page in memory is only permitted to be associated with a single/unique guest physical address (no guest physical address aliasing is allowed), and in-use private guest pages cannot be remapped without involving the corresponding virtual machine as described herein. In addition, alone or in combination with other techniques, such as encryption of virtual machine memory regions, protection for virtual machine processor state (e.g., registers, etc.), the described embodiments can avoid the need for implicit trust in hypervisors, which can simplify the administration, improve security, etc. for computing devices. The described embodiments can therefore improve the security, operational stability, and value to consumers of computing devices.

Computing Device

Figure 2:
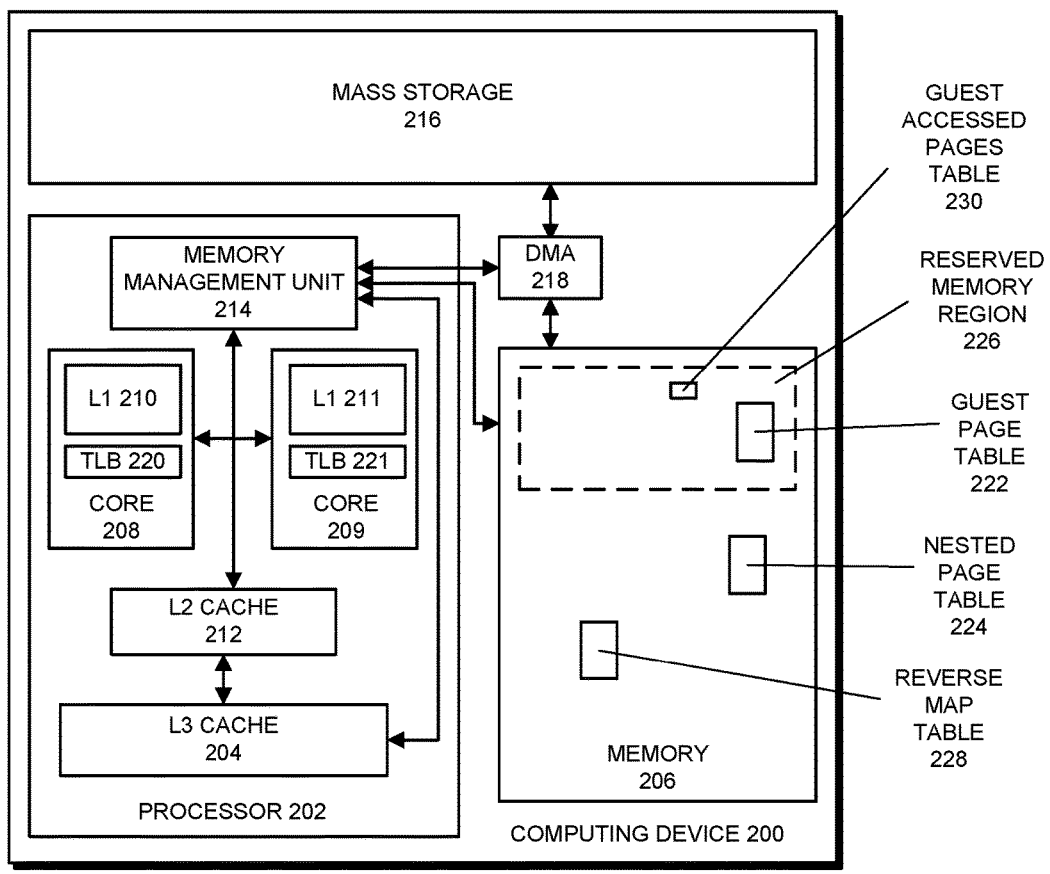
FIG. 2 presents a block diagram illustrating a computing device in accordance with some embodiments.

FIG. 2 presents a block diagram illustrating a computing device 200 in accordance with some embodiments. As can be seen in FIG. 2, computing device 200 includes processor 202, memory 206, mass storage 216, and direct memory access mechanism ("DMA") 218. Processor 202 is a device that performs computational operations in computing device 200. Processor 202 includes two cores, cores 208 and 209, each of which includes one or more computational mechanisms such as central processing units (CPUs), graphics processing units (GPUs), embedded processors, application specific integrated circuits (ASICs), and/or other computational mechanisms.

Processor 202 also includes cache memories (or "caches") that are used for locally storing data and instructions that are used by cores 208 and 209 for performing computational operations. As can be seen in FIG. 2, the caches in processor 202 include level-one (L1) caches 210 and 211 ("L1 210" and "L1 211") in each of cores 208 and 209. Each L1 cache includes memory circuits such as one or more of static random access memory (SRAM), dynamic random access memory (DRAM), double data rate synchronous DRAM (DDR SDRAM), and/or other types of memory circuits for storing data and instructions for use by the corresponding core 208 and 209, as well as control circuits for handling accesses of the data and instructions that are stored in the memory circuits. Processor 202 additionally includes a shared level-two (L2) cache 212 that includes memory circuits such as one or more of SRAM, DRAM, DDR SDRAM, and/or other types of memory circuits for storing data and instructions for use by both cores 208 and 209, as well as control circuits for handling accesses of the data and instructions that are stored in the memory circuits. Processor 202 further includes a shared level-three (L3) cache 204 that includes memory circuits such as one or more of SRAM, DRAM, DDR SDRAM, and/or other types of memory circuits for storing data and instructions for use by both cores 208 and 209, as well as control circuits for handling accesses of the data and instructions that are stored in the memory circuits.

Memory 206 is the "main memory" of computing device 200, and includes memory circuits such as one or more of DRAM, DDR SDRAM, non-volatile random access memory (NVRAM), and/or other types of memory circuits for storing data and instructions for use by functional blocks in computing device 200, as well as control circuits for handling accesses of the data and instructions that are stored in the memory circuits. Virtual machines executed by computing device may have corresponding regions of memory allocated for the exclusive use of the virtual machines, so that a given virtual machine is the only virtual machine that should be accessing data in the corresponding region.

Mass storage 216 is a mass-storage device such as a high-capacity semiconductor memory (a non-volatile semiconductor memory such as a flash memory, an NVRAM, etc.), a disk drive (hard drive, etc.), an optical drive, etc. that stores data and instructions for use in computing device 200.

In the described embodiments, mass storage 216 holds data and instructions that are acquired to be stored in memory 206 for subsequent use by functional blocks in computing device 200. For example, data and/or instructions may be retrieved from mass storage 216 in blocks or "pages" of a given size (e.g., 4 kB, 2 MB, 1 GB, etc.) and the pages can be stored in memory 206. In addition, pages may be newly created at an available physical location in memory 206 (e.g., for storing computational results, etc.). Pages retrieved from mass storage 216 for storage in memory 206 may be reserved for the exclusive access of a particular virtual machine or may be shared between virtual machines.

Memory management unit 214 is a functional block that handles memory access requests in processor 202. When data and instructions are to be accessed by a functional block in processor 202 (i.e., read, written, checked/verified, deleted, invalidated, etc. by core 208 or another functional block), the functional block sends a memory access request to memory management unit 214. Memory management unit 214 then sends a corresponding request to one or more of L2 cache 212, L3 cache 204, and memory 206 for satisfaction/resolution of the memory access request. For example, if data is to be retrieved based on the memory access request, memory management unit 214 may acquire the data from L2 cache 212, L3 cache 204, or memory 206 (or mass storage 216, should the data not be present in one of L2 cache 212, L3 cache 204, or memory 206) and forward the data to the requesting functional block.

As described above, computing device 200 uses virtual memory to enable software programs (e.g., executed by cores 208 and 209) to access memory using virtual addresses that must be translated into physical addresses. Upon receiving a memory access request from a program with a virtual address, memory management unit 214, e.g., a table walker functional block in memory management unit 214, performs operations for translating the virtual address into the physical address for the pages where data is located in memory 206.

In some embodiments, memory management unit 214 uses two mechanisms for performing virtual address to physical address translations. The first of the mechanisms is a hierarchy of page tables that includes a page table associated with each guest operating system and a page table associated with the hypervisor. Examples of the page tables are shown in FIG. 2 as guest page table 222 and nested page table 224, which are associated with a guest operating system and hypervisor, respectively. Each page table is a data structure (e.g., one or more tables, an array, a list, etc.) that is stored in memory 206. For example, a guest page table 222 may be stored in a memory region, such as reserved memory region 226 that is allocated for the exclusive access of a corresponding virtual machine. In some embodiments, a given page table stores at least one translation for each page present in memory 206 that was stored in memory 206 by a corresponding program, virtual machine, etc. Thus, in these embodiments, if a page has been copied from mass storage 216 to memory 206 or newly created in memory 206 and remains available in memory 206, an associated virtual address to physical address translation should exist in a corresponding page table. As described above, the table walker uses guest page table 222 and nested page table 224 to perform virtual address to physical address translations.

The second of the mechanisms for performing virtual address to physical address translations is translation lookaside buffers 220 and 221 ("TLB 220" and "TLB 221"), which are caches in each of core 208 and 209 that are configured to store/cache virtual address to physical address translation information acquired during page table walks. Cores 208 and 209 acquire virtual address to physical address translation information from the corresponding TLB 220 and 221, when possible, to avoid performing a page table walk.

Direct memory access mechanism 218 is a functional block that is configured to perform transfers of data from mass storage 216 to memory 206 and vice versa. Generally, direct memory access mechanism 218 offloads data transfer operations from processor 202, which enables processor 202 to avoid performing some of the computational work involved with performing memory transfers.

Computing device 200 includes reverse map table 228 stored in memory 206. Reverse map table 228 is a data structure (e.g., a table, a list, etc.) that includes a number of entries, one entry for each page of memory in memory 206 that may be allocated for the use of one or more virtual machines. For example, if a memory 206 includes 32 GB of memory that may be allocated in 4 kB pages to virtual machines, reverse map table includes 8,388,608 entries. Reverse map table 228 is used by the hypervisor and other entities for keeping records that include information indicating guest physical addresses that are associated with system physical addresses, and for keeping records of other information associated with corresponding pages. In this way, computing device 200 maintains a record that can be used to detect when changes are made to the nested page table. Reverse map table 228 is described in more detail below.

Computing device 200 includes guest accessed pages table 230 stored in memory 206. Guest accessed pages table 230 is a data structure (e.g., a bitmask, a string, a table, a list, etc.) that includes a number of indicators, one for each page of memory that is allocated for the access of a corresponding virtual machine. For example, if a 4 GB region of memory is allocated for the exclusive access of a corresponding virtual machine and pages are 4 kB in size, in an embodiment where guest accessed pages table 230 is a bitmask, guest accessed pages table 230 is 1,048,576 bits in size. When a corresponding virtual machine is accessing (i.e., has read, written, and/or otherwise interacted with) a corresponding page, the virtual machine (and/or another entity such as the table walker, etc.) sets the corresponding indicator to a predetermined value such as 1. The virtual machine may otherwise clear the indicator or set the indicator to a value such as 0. For example, in embodiments where guest accessed pages table 230 is a bitmask, when a page at a given location in memory is being accessed, the corresponding bit can be set to 1, and set to 0 when the virtual machine is not accessing the page. In this way, a virtual machine keeps a record of the pages that are being accessed by the virtual machine. Guest accessed pages table 230 is described in more detail below.

In some embodiments, the hypervisor is blocked from directly accessing reverse map table 228 and guest accessed pages table 230. For example, one or both of reverse map table 228 and guest accessed pages table 230 may be stored in memory region(s) to which the hypervisor does not have direct access. For instance, as shown in FIG. 2, guest accessed pages table 230 may be stored in a reserved memory region 226 that is allocated for the exclusive use of a corresponding virtual machine. As another example, one or both of reverse map table 228 and guest accessed pages table 230 may be encrypted into a form that is not directly decryptable by the hypervisor. In some embodiments, one or both of reverse map table 228 and guest accessed pages table 230 are stored in a region of memory that is not directly accessible to the hypervisor and encrypted. For example, in some embodiments, reserved memory region 226 is both allocated for the exclusive use of a corresponding virtual machine and encrypted. Although no "direct" access is permitted to reverse map table 228 and guest accessed pages table 230 by the hypervisor, the hypervisor may cause other elements or entities in computing device 200 (such as processors, etc.) to perform operations on the tables and using the information in tables. Such operations are described below.

In some embodiments, communication paths (that include one or more busses, wires, guides, and/or other connections) are coupled between the various functional blocks in computing device 200 (processor cores 208 and 209, memory management unit 214, memory 206, etc.), as shown by arrow-headed lines between the elements. The communication paths are used to transmit commands, data, control signals, and/or other information between the functional blocks.

Although embodiments are described with a particular arrangement of cores, some embodiments include a different number and/or arrangement of cores. For example, some embodiments have only one core, while other embodiments have two, five, eight, or another number of cores. Generally, the described embodiments can use any arrangement of cores that can perform the operations herein described.

Although embodiments are described with a particular arrangement of caches, some embodiments include a different number and/or arrangement of caches. For example, some or all of the caches (e.g., L1 cache 210 and 211, etc.) may be divided into separate instruction and data caches. Additionally, L2 cache 212 may not be shared, and hence may only be used by a single core (i.e., there may be two L2 caches in processor 202). As another example, some embodiments include different levels of caches, from only one level of cache to multiple levels of caches, and these caches may be located in processor 202 and/or external to processor 202. Generally, the described embodiments can use any arrangement of caches that can perform the operations herein described.

Although computing device 200 and processor 202 are simplified for illustrative purposes in FIG. 2, in some embodiments, computing device 200 and/or processor 202 include additional or different elements and mechanisms for performing the operations herein described and other operations. For example, computing device 200 and/or processor 202 may include power controllers, batteries, media processors, input-output mechanisms, communication mechanisms, networking mechanisms, display mechanisms, etc.

Processor 202, memory 206, mass storage 216, and direct memory access mechanism 218 are some examples of "hardware" that may be represented by computing device hardware 110 in FIG. 1. In some embodiments, therefore, host operating system 108 and/or hypervisor 106 interface between processor 202, memory 206, mass storage 216, and direct memory access mechanism 218 and guest operating system 102 and programs 104. In these embodiments, computing device 200 (e.g., cores 208-209, etc.) executes hypervisor 106, virtual machines 100, guest operating systems 102, and programs 104, as well as host operating system 108, in embodiments in which host operating system 108 is present. In addition, references to "the computing device" and elements within the computing device in this description may refer to computing device 200 and the associated elements.

Computing device 200 can be, or can be included in, any electronic device that performs computational operations. For example, computing device 200 can be, or can be included in, electronic devices such as desktop computers, laptop computers, wearable computing devices, tablet computers, smart phones, servers, network appliances, toys, audio-visual equipment, home appliances, controllers, vehicles, etc., and/or combinations thereof.

Page Table

Figure 3:
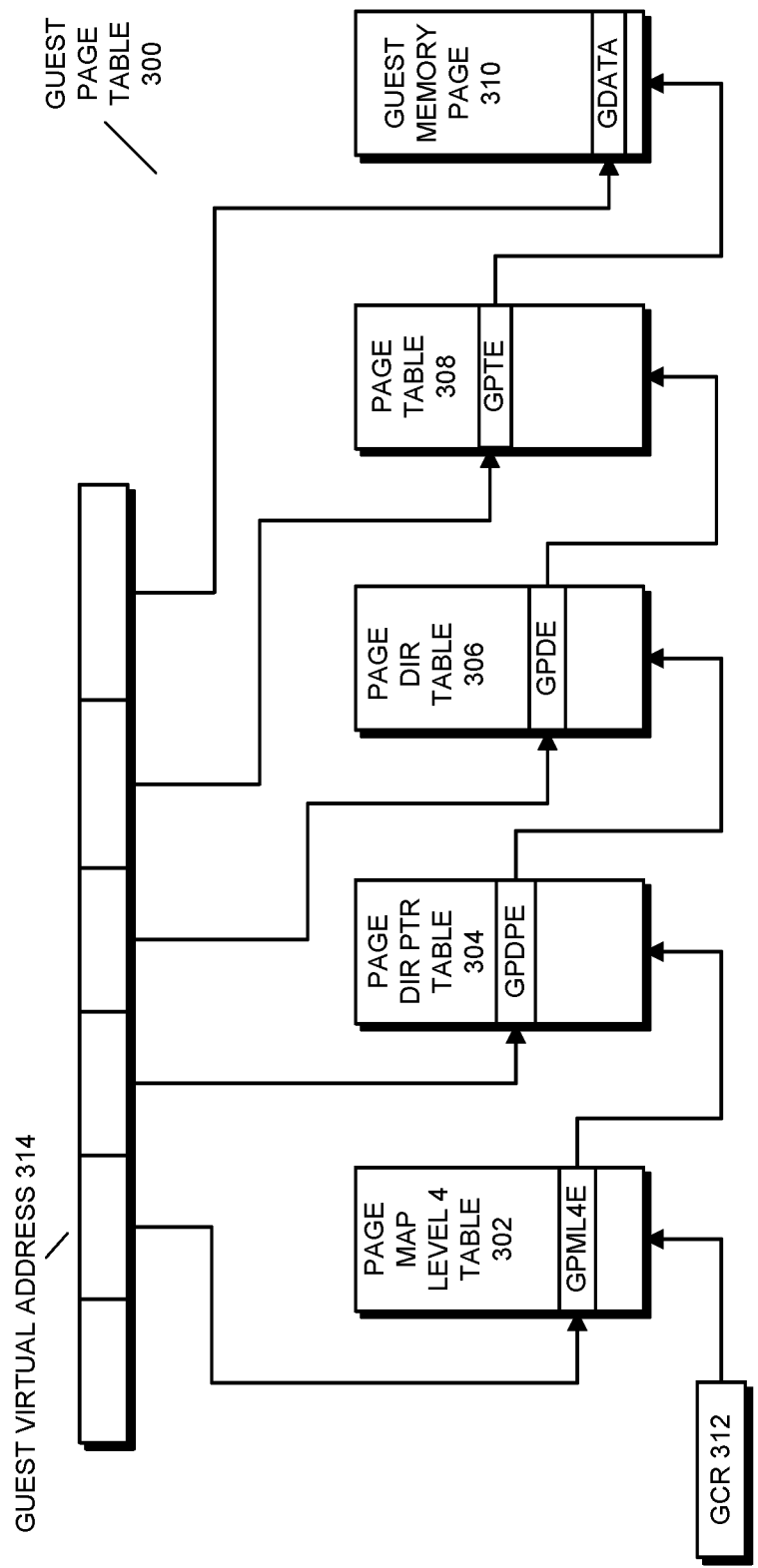
FIG. 3 presents a block diagram illustrating a set of tables used to implement a guest page table in accordance with some embodiments.

As described above, the computing device uses a hierarchy of page tables for performing address translations. FIG. 3 presents a block diagram illustrating a set of tables used to implement a guest page table in accordance with some embodiments. The nested page table can be implemented in a similar way to the arrangement of tables shown in FIG. 3.

As can be seen in FIG. 3, guest page table 300 includes page map level 4 table 302, page directory pointer table ("PAGE DIR PTR TABLE") 304, page directory table ("PAGE DIR TABLE") 306, page table 308, and guest memory page 310. Page map level 4 table 302, page directory pointer table 304, page directory table 306, and page table 308 are data structures (e.g., tables, linked lists, etc.) that are stored in memory. Page map level 4 table 302, page directory pointer table 304, and page directory table 306 each include information about a subsequent table to be searched (or "walked") during a next step of a table walk to find a guest physical address. For 29, page map level 4 table 302 includes a number of entries, each of which includes information mapping corresponding sub-sets of address bits from virtual addresses to page directory pointer tables (such as page directory pointer table 304, as shown in FIG. 3). Page table 308 includes guest physical addresses indicating particular guest memory pages associated with corresponding portions of guest virtual addresses. Guest memory page 310 is a specific page (or a virtual page) in memory where data indicated by guest virtual address 314 is located (recalling that guest physical addresses may need to be translated to system physical addresses to enable accessing data in memory).

In some embodiments, when performing a table walk in guest page table 300 to acquire a guest physical address that is associated with a virtual address, a table walker reads guest control register ("GCR") 312 to determine a location, in memory, of a page map level table associated with the corresponding virtual machine (e.g., page map level 4 table 302). The table walker then searches (or "walks") the page map level 4 table 302 using a sub-set of the bits from the virtual address (e.g., bits 39-47 of a 64-bit virtual address) for an entry (shown as "GPML4E") indicating a location of a page directory pointer table to be walked next (e.g., page directory pointer table 304). The table walker next proceeds through the remaining tables, i.e., the page directory pointer table 304, a page directory table (e.g., page directory table 306), and a page table (e.g., page table 308), using corresponding sub-sets of bits from the virtual address to walk each table and locate an entry in the table (shown as "GPDPE" and "GPDE") that indicates a next table to be walked. Eventually, using an address acquired from the page table 308 (shown as "GPTE"), the table walker arrives at a particular guest memory page (e.g., guest memory page 310). Using a corresponding portion of bits of the guest virtual address 314 (e.g., bits 0-11 of the 64-bit virtual address), the table walker determines an entry (GDATA) in the guest memory page 310 that includes data indicated by the guest virtual address. If the table walker is unable to find an address translation for the virtual address, an error-handling operation is performed (e.g., a page fault is emitted and subsequently processed, etc.).

As described herein, address translation information may be modified/changed, updated, etc. after being added to guest page table 300. For example, when a page is moved from a first location to a second location in memory, re-assigned from a first virtual machine to a second virtual machine, etc., one or more tables in the set of tables can be updated accordingly. As another example, the hypervisor may improperly (maliciously, erroneously, etc.) update an address mapping in guest page table 300, such as by writing incorrect information in one or more tables in the set of tables. The described embodiments use the reverse map table 228 and the guest accessed pages table 230 to avoid using improperly updated information from guest page table 300. In other words, the described embodiments enforce rules such as each page in memory is only permitted to be associated with a single/unique guest physical address (no guest physical address aliasing is allowed), and in-use private guest pages cannot be remapped without involving the corresponding virtual machine as described herein.

Although a particular arrangement of tables is shown in FIG. 3, in some embodiments a different number and/or arrangement of tables is used. For example, in some embodiments, only a single table is used, the single table mapping virtual addresses to physical addresses (or, e.g., virtual addresses to guest physical addresses, etc.).

Reverse Map Table

Figures 4, 5:
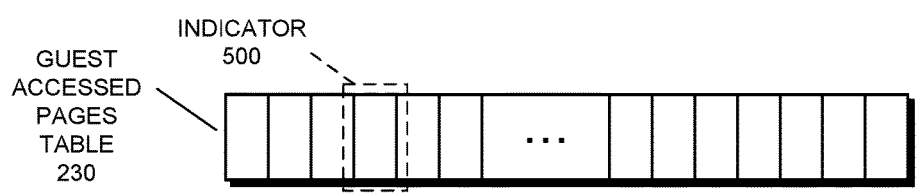
FIG. 4 presents a block diagram illustrating a reverse map table in accordance with some embodiments.
FIG. 5 presents a block diagram illustrating a guest accessed pages table in accordance with some embodiments.

FIG. 4 presents a block diagram illustrating reverse map table 228 in accordance with some embodiments. As described above, reverse map table 228 includes information that is used, among other things, to determine whether a table walk of nested page table 224 for a guest physical address returns a system physical address that matches a previously-used system physical address.

As can be seen in FIG. 4, reverse map table 228 includes a number of entries 400 (an entry 400 is highlighted using a dashed line in FIG. 4). Each entry in reverse map table 228 includes information about a corresponding page in memory 206 (e.g., each 4 kB page in memory that may be allocated for use by one or more virtual machines). The entries in reverse map table 228 are indexed using system physical addresses associated with each page, so that each entry is associated with a particular system physical address. For example, for 4 kB pages, a first entry in reverse map table 228 may be associated with a first or lowest allocatable system physical address (address A), a second entry may be associated with a second allocatable system physical address (address A+4 kB), and so forth. In this way, when a particular system physical address is to be looked up in reverse map table 228, an entry at a corresponding offset in reverse map table 228 may be looked up. In some embodiments, a base address of reverse map table 228 is recorded in a specified, and possibly secure, location in computing device 200 to enable the offset-based lookups.

In reverse map table 228, each entry 400 is configured to store global shared pages ("GSP") 402, guest identifier ("GUEST ID") 404, guest physical address ("GUEST PHY ADDR") 406, sub-page count 408, access indicator 410, size indicator 412, and valid indicator 414. Global shared pages 402 is an indicator of whether the corresponding page is shared by two or more virtual machines. Shared pages are described in more detail below.

Guest identifier 404 is an identifier associated with a virtual machine to which the corresponding page is allocated. For example, when the corresponding page is allocated for the use of a particular virtual machine, an identifier for the particular virtual machine is recorded in guest identifier 404. Guest identifier 404 may hold an address space identifier ("ASID"), an ID string, a name, and/or another value that specifically identifies a virtual machine.

Guest physical address 406 is a value that represents a guest physical address that is associated with the system physical address for the entry. For example, when a page at a given system physical address is allocated for the use of a virtual machine, the guest physical address to be used by the virtual machine for addressing the page is recorded in the corresponding entry 400 in reverse map table 228. In this way, a record is made of the particular guest physical address to be used by the virtual machine for which each page is allocated. As described below, recording this information enables the table walker to determine, when checking a system physical address acquired during a walk of the nested page table, whether the system physical address maps to the expected guest physical address, i.e., whether the system physical address has been mapped to two different guest physical addresses at the same time. This can enable detecting whether the mapping has been changed maliciously or erroneously by a hypervisor (or another entity).

Sub-page count 408 is a count of smaller-sized pages allocated for virtual machine(s) within a larger-sized page. For example, in a system that supports 2 MB pages and 4 kB pages, a page on a 2 MB boundary (e.g., pages at addresses A, A+2 MB, A+4 MB, etc.) can have a count of 4 kB pages within the 2 MB page that have been allocated for use by a virtual machine. The sub-page count value can be used to determine whether an access to a larger-sized page is impermissible, given that smaller pages have been allocated within the larger-sized page, i.e., to avoid an impermissible access made using an improper page size.

Access indicator 410 is an indicator of whether the corresponding page has been accessed (read, written, updated, and/or otherwise accessed) by a virtual machine for which the corresponding page is allocated. A given access indicator 410 is set when a corresponding page is accessed at least once by a virtual machine to which the corresponding page is allocated. An access indicator 410 is cleared when an entry in reverse map table 228 is updated by the hypervisor. In tandem with the information in guest accessed pages table 230, a cleared accessed bit 410 can be used to determine that the hypervisor has updated the reverse map table 228 since the corresponding page was last accessed.

Size indicator 412 is an expected size for an access of a corresponding page. For example, assuming 4 kB pages and 2 MB pages are used in computing device 200, size indicator 412 can indicate which size of an access was requested. Size indicator 412 enables detection of impermissibly-sized accesses such as a 2 MB access of what is actually a 4 kB page.

Valid indicator 414 is an indicator of whether the entry 400 currently holds valid information, i.e., whether the information that is currently in the entry 400 is stale, outdated, etc., or is useable. Valid indicator 414 is used to prevent the use of information from entries 400 in reverse map table 228 that are stale, but may still contain old information (undeleted information, random bit patterns, etc.), that are initialized, but do not contain actual information, etc.

Although reverse map table 228 is described with various information in each entry, in some embodiments, a different arrangement or type of information may be present in each entry. Generally, the entries 400 in reverse map table 228 includes sufficient information to perform the operations herein described.

Guest Accessed Pages Table

FIG. 5 presents a block diagram illustrating guest accessed pages table 230 in accordance with some embodiments. As described above, guest accessed pages table 230 includes information that is used to determine whether a corresponding virtual machine is recorded as having previously accessed pages in a region of memory allocated for the use of the virtual machine.

As can be seen in FIG. 5, guest accessed pages table 230 includes a number of indicators 500 (an indicator 500 is highlighted using a dashed line in FIG. 5). In the described embodiments, each guest accessed pages table 230 includes an indicator 500 for each page of memory (e.g., 4 kB page) that is allocated for the use of the corresponding virtual machine. Each indicator 500 includes information to be used to determine whether the virtual machine has accessed the corresponding page. For example, the indicators may include a single bit that is set to 0 to indicate that the corresponding page has not been accessed, and is set to 1 to indicate that the corresponding page has been accessed.

Although guest accessed pages table 230 is described as having a number of indicators 500, in some embodiments, a different arrangement or type of information is present in guest accessed pages table 230. Generally, guest accessed pages table 230 includes sufficient information to enable the determination of whether a virtual machine has accessed certain pages.

Updating the Reverse Map Table

Figures 6, 7:
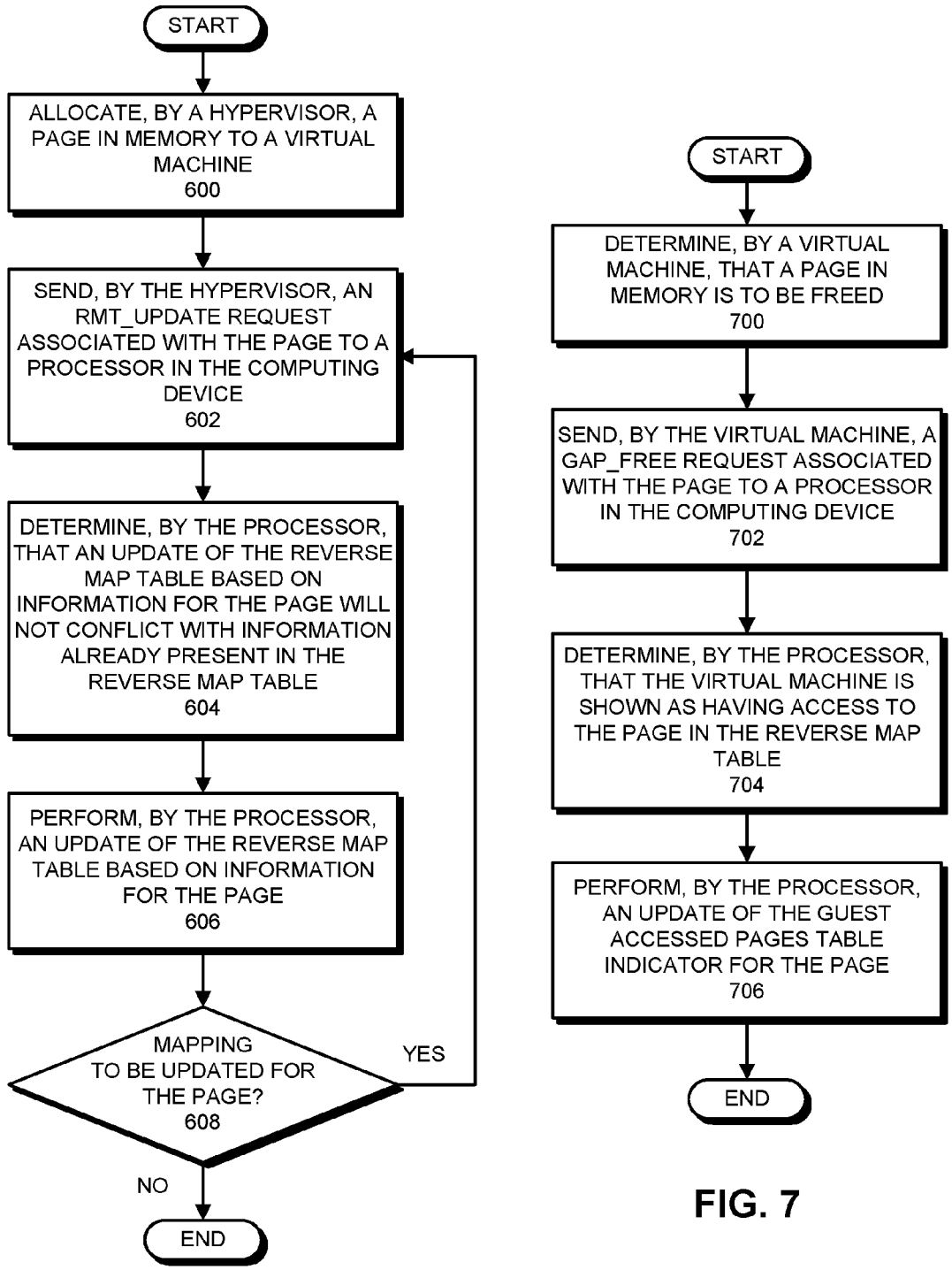
FIG. 6 presents a block diagram illustrating a process for updating a reverse map table in accordance with some embodiments.
FIG. 7 presents a block diagram illustrating a process for clearing an indicator in the guest accessed pages table in accordance with some embodiments.

FIG. 6 presents a block diagram illustrating a process for updating reverse map table 228 in accordance with some embodiments. The operations shown in FIG. 6 are presented as a general example of operations performed by some embodiments. The operations performed by other embodiments include different operations and/or operations that are performed in a different order. Additionally, although certain mechanisms/elements are used in describing the operations (e.g., a hypervisor, etc.), in some embodiments, other mechanisms perform the operations and/or the operations are performed on other mechanisms/elements.

The process shown in FIG. 6 starts when a hypervisor in a computing device allocates, to a virtual machine, a page in memory (step 600). For example, the hypervisor may allocate a particular page along with other pages in a region of memory when allocating the region of memory for the use of the virtual machine. The allocation may be performed when the virtual machine is newly initialized, during operation of the virtual machine as the virtual machine requests the allocation of one or more pages, etc. During the allocation, the hypervisor may also update the nested page table with corresponding guest physical address to system physical address information.

Upon allocating the page, the hypervisor sends, to a processor in computing device, an RMT_UPDATE request associated with the page (step 602). When sending the RMT_UPDATE request to the processor, the hypervisor may execute a corresponding instruction (e.g., a special CPU instruction, etc.), access a dedicated register (e.g., a model-specific register, etc.), and/or use another mechanism. The RMT_UPDATE request causes the processor to perform operations for updating an entry in reverse map table 228 associated with the page of memory. In some embodiments, the RMT_UPDATE request includes sufficient information to enable the updating of the entry in reverse map table 228 without acquiring information from other sources (e.g., from the virtual machine, etc.). For example, the RMT_UPDATE request may include a system physical address where the page is located, a guest physical address to be used by the virtual machine for addressing the page, an identifier for the virtual machine, a page size, an indication of whether the page is shared, and/or other information. In other embodiments, the processor acquires some or all of the information from another source. For example, the hypervisor and/or the virtual machine may write information about the page into a specified memory element (e.g., memory 206, a dedicated register, etc.) and the processor may read the memory element to acquire the information. As another example, the processor may request information from hypervisor and/or the virtual machine.

The processor then determines that an update of reverse map table 228 based on the information for the page will not conflict with information already present in the reverse map table (step 604). For example, the processor may compare the size of the page to page sizes in one or more other entries to ensure that the information for the page does not describe a page that overlaps with one or more existing pages. For instance, the processor determines that information about a smaller page (e.g., 4 kB) will not to be written to an entry in reverse map table 228 for which the system physical address falls within a set of system physical addresses in use for a larger page (e.g., 2 MB) at another location in reverse map table 228. In other words, the processor determines that a smaller page does not overlap with a larger page. Similarly, the processor may determine that a larger page does not overlap with one or more smaller pages. If a conflict was detected, the processor may perform a remedial action such as raising a fault, signaling an error to the hypervisor and/or the virtual machine, etc.

The processor then performs an update of reverse map table 228 for the page (step 606). During the update of reverse map table 228, the processor writes some or all of the above-described information (i.e., the system physical address, the guest physical address, the identifier for the virtual machine, the page size, etc.) about the page to corresponding fields in the entry of the reverse map table. When the update is complete, reverse map table 228 includes sufficient information in the corresponding entry for consumers of the information in the computing device (e.g., the table walker, etc.) to determine a guest physical address to which the system physical address for the entry maps, a particular virtual machine that has access to the page, etc.

When updating reverse map table 228, the processor sets the access indicator for the entry to a value (e.g., 0) that indicates that the entry has not yet been accessed by the corresponding virtual machine. In this way, the processor configures the entry to indicate to consumers of the information that the entry in the reverse map table 228 has been updated by the hypervisor. This can help to avoid a case where the hypervisor maliciously, erroneously, etc. changes the reverse map table 228.

In some embodiments, if the entry was previously valid, i.e., if the updating overwrites information that was already present in the reverse map table 228, the processor can flush related information from TLBs in the computing device (and may simply flush all information from the TLBs). In this way, the processor removes from the TLBs any stale copies of translation information associated with the system physical address and/or guest physical address that is being overwritten.

In some embodiments, the processor updates sub-page counts for one or more entries when updating the entry in reverse map table 228. For example, for a given smaller page, the processor finds and updates an entry for one or more larger pages within which the smaller page may reside.

For instance, when an entry is updated with information about a 4 kB page, the processor updates information for an entry for a larger page, which itself may not be allocated, to reflect that the region of the larger page includes a smaller page. In this way, the processor adds information to the table for simplifying the determination in step 604 that an update of reverse map table 228 based on the information for the page will not conflict with information already present in the reverse map table. That is, the processor sets the sub-page count so that updates for the entry for a larger page can be stopped using just information from the sub-page count, without checking each corresponding smaller page entry in reverse map table 228.

During subsequent operation, the hypervisor determines whether a mapping for the page is to be updated (step 608). For example, the hypervisor assigns the page to a different virtual machine because the corresponding virtual machine is no longer using the page, thereby necessitating an update of the guest physical address associated with the existing system physical address. Upon making the determination, the hypervisor causes steps 602-606 to be performed to update the corresponding entry in reverse map table 228. As described above, during the updating, the processor writes some or all of the above-described information (i.e., the system physical address, the guest physical address, the identifier for the virtual machine, the page size, etc.) about the page to corresponding fields in the entry of the reverse map table. The processor also sets the access indicator to 0 to indicate that the entry in the reverse map table 228 has been updated. When the mapping for the page is not to be updated (step 608), the process ends.

As shown in FIG. 6, the hypervisor does not have "direct" access to reverse map table 228. Instead, the hypervisor sends the RMT_UPDATE request and the processor handles the update as described above (including clearing the access indicator). By limiting the hypervisor's access to the reverse map table 228 to the RMT_UPDATE operation as described, the described embodiments avoid the situation where the hypervisor maliciously, erroneously, etc. updates both the nested page table and the reverse map table 228, thereby possibly concealing the update of the nested page table.

In some embodiments, when the hypervisor is to terminate a particular virtual machine, the hypervisor reclaims the pages allocated to the virtual machine and subsequently re-allocates the pages by modifying the nested page table and reverse map table 228.

In some embodiments, when multiple processors are operating on reverse map table 228 concurrently (e.g., updating one or more entries at substantially the same time), the computing device performs operations for synchronizing updates/accesses of reverse map table 228. For example, the computing device may lock some or all of reverse map table 228 so that only a single processor may access reverse map table 228 until the lock is released.

Clearing an Indicator in the Guest Accessed Pages Table

FIG. 7 presents a block diagram illustrating a process for clearing an indicator in guest accessed pages table 230 in accordance with some embodiments. The operations shown in FIG. 7 are presented as a general example of operations performed by some embodiments. The operations performed by other embodiments include different operations and/or operations that are performed in a different order. Additionally, although certain mechanisms/elements are used in describing the operations (e.g., a virtual machine, etc.), in some embodiments, other mechanisms perform the operations and/or the operations are performed on other mechanisms/elements.

Figure 8:
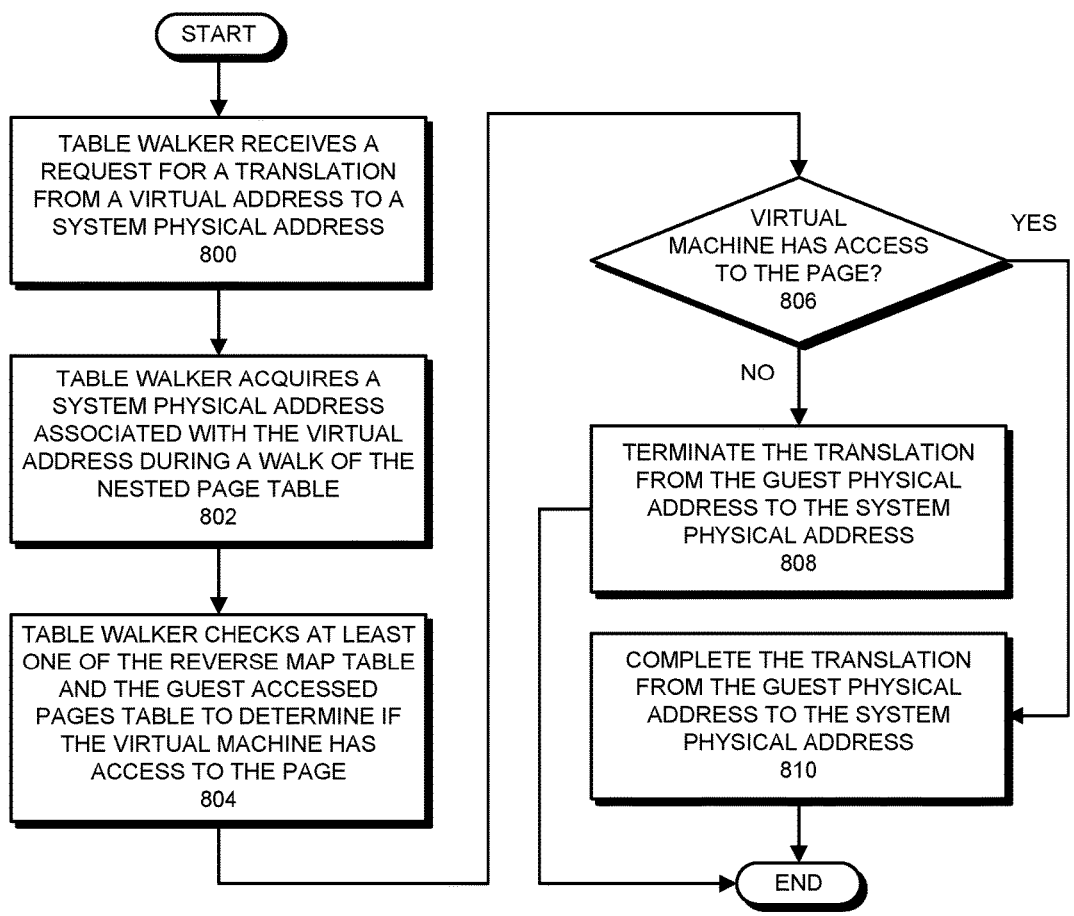
FIG. 8 presents a block diagram illustrating a process for using the reverse map table and the guest accessed pages table in accordance with some embodiments.
Figure 9:
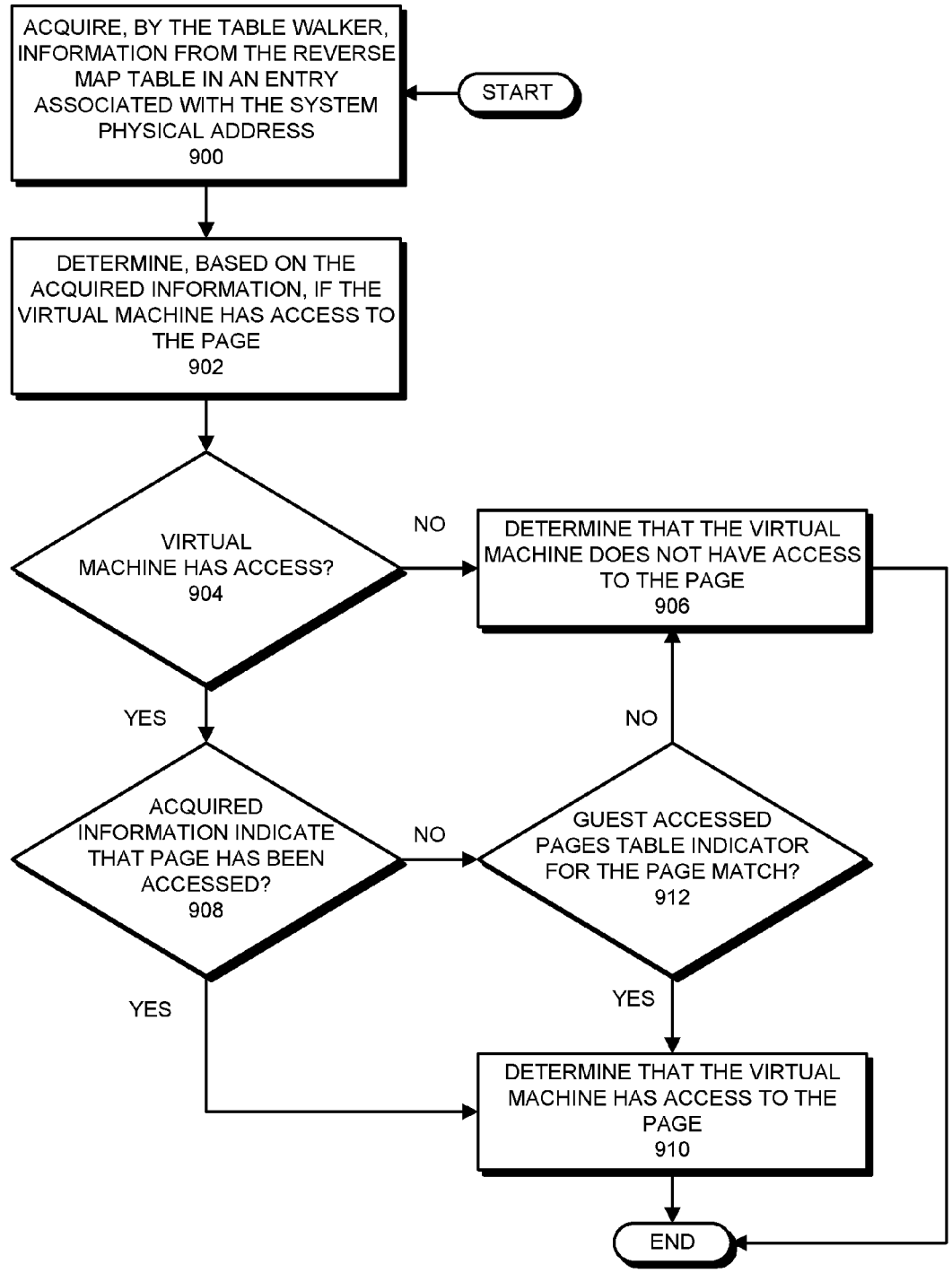
FIG. 9 presents a block diagram illustrating a process for determining whether the virtual machine has access to the corresponding page in accordance with some embodiments.

For the example in FIG. 7, it is assumed that the operation of FIGS. 8-9 has been performed. In other words, a page of memory has already been marked as accessed by the table walker.

The process shown in FIG. 7 starts when a virtual machine determines that the page of memory is to be freed (step 700). For example, the virtual machine may determine that an allocated page is no longer being used and therefore may be returned for reallocation by the hypervisor.

The virtual machine then sends, to a processor, a GAP_FREE request associated with the page (step 702). The GAP_FREE request causes the processor perform operations for updating an entry in the guest accessed pages table 230 associated with the virtual machine. In some embodiments, the GAP_FREE request includes information identifying the page (e.g., a guest physical address), the size of the page, and/or the requesting virtual machine (e.g., a guest ID such as an address space identifier for the virtual machine).

The processor then determines that the virtual machine is shown as having access to the page in reverse map table 228 (step 704). For example, the processor may acquire information from a corresponding entry in reverse map table 228 and verify that the entry is valid, that the guest physical address from the entry matches the information identifying the page from the request, that reverse map table 228 shows that the page has been accessed (e.g., via checking the access indicator in the entry), that the guest ID matches a guest ID for the requesting virtual machine, that the page size from the entry matches a size of the page indicated in the GAP_FREE, and/or perform other checks. If the virtual machine is not shown as having access to the page, the processor performs a remedial action such as raising a fault, signaling an error to the virtual machine and/or the hypervisor, etc.

The processor then performs an update of guest accessed pages table 230 for the page (step 706). During the update of guest accessed pages table 230, the processor sets an indicator for the page to a specified value (e.g., 0) to show that the page is not being accessed by the virtual machine. When the update is complete, guest accessed pages table 230 includes sufficient information in the corresponding indicator for consumers of the information in the computing device (e.g., the table walker, etc.) to determine that the virtual machine is not accessing the corresponding page.

When updating guest accessed pages table 230 as described, the processor also updates the corresponding entry in reverse map table 228 to show that the page is not being accessed by the virtual machine. For example, via an RMT_UPDATE operation, the processor can set, in the corresponding entry in reverse map table 228, the access indicator to a value that indicates that the page is not being accessed (e.g., 0). In this way, the processor ensures that the indicator in the guest accessed pages table 230 for a page and the access indicator in the reverse map table 228 agree with one another regarding whether the page is not being accessed.

In some embodiments, the GAP_FREE operation is the only mechanism that is available to the virtual machine for accessing guest accessed pages table 230. In other words, in these embodiments, the virtual machine is blocked from directly accessing, and therefore cannot simply write values to, guest accessed pages table 230. Having the virtual machine use the GAP_FREE operation ensures that, for example, reverse map table 228 is checked and updated as described above when the virtual machine updates guest accessed pages table 230.

Using the Reverse Map Table and the Guest Accessed Pages Table

FIG. 8 presents a block diagram illustrating a process for using the reverse map table and the guest accessed pages table in accordance with some embodiments. The operations shown in FIG. 8 are presented as a general example of operations performed by some embodiments. The operations performed by other embodiments include different operations and/or operations that are performed in a different order. Additionally, although certain mechanisms/elements are used in describing the operations (e.g., a processor, etc.), in some embodiments, other mechanisms perform the operations and/or the operations are performed on other mechanisms/elements.

The process shown in FIG. 8 starts when a table walker (e.g., a hardware table walker in a memory management unit) receives a request from a processor (e.g., from a load/store unit in a processor) for a translation from a given virtual address to a system physical address (step 800). For example, the processor may, while executing a virtual machine, encounter a request to perform a memory access at the given virtual address for the virtual machine. The processor may then send the request to the table walker for the translation from the given virtual address to a system physical address.

The table walker then performs table walks in the corresponding guest page table and the nested page table, eventually acquiring the system physical address associated with the virtual address (step 802). While acquiring the system physical address during the page table walk, the table walker may also acquire other information from the nested page table (or elsewhere), such as the size of the page, etc. The processor may also check one or more TLBs in an attempt to find a cached copy of the translation, in an attempt to avoid performing the table walks. It is assumed for this example, however, that a cached copy of the translation is not available.

Upon acquiring the system physical address, the table walker checks at least one of the reverse map table and the guest accessed pages table to determine whether the virtual machine has access to the corresponding page (step 804). FIG. 9 presents a block diagram illustrating a process for checking at least one of the reverse map table and the guest accessed pages table to determine whether the virtual machine has access to the corresponding page in accordance with some embodiments. The operations shown in FIG. 9 are presented as a general example of operations performed by some embodiments. The operations performed by other embodiments include different operations and/or operations that are performed in a different order. Additionally, although certain mechanisms/elements are used in describing the operations (e.g., a table walker, etc.), in some embodiments, other mechanisms perform the operations and/or the operations are performed on other mechanisms/elements.

As shown in FIG. 9, the process starts when the table walker acquires, from reverse map table 228, information in an entry associated with the system physical address (step 900). For example, the table walker may acquire the information from an entry in the reverse map table 228 at an offset from a base address of the reverse map table 228 proportional to or otherwise based on the system physical address. As described above, in some embodiments, the information from the entry includes some or all of a recorded guest ID, a recorded guest physical address, a recorded sub-page count, a recorded access indicator, a recorded size, and a valid indicator.

The table walker then determines, based on the acquired information, if the virtual machine has access to the page (step 902). For example, the table walker can determine whether the entry is valid, as shown by the valid indicator. As another example, the table walker can determine if the recorded guest physical address from the entry matches the guest physical address associated with the request from the virtual machine (i.e., acquired from the guest page table during the corresponding table walk). As another example, the table walker can determine if the page size acquired from the nested page table matches the recorded page size from the entry. As another example, the table walker can determine if the recorded guest ID from the entry matches an identifier associated with the requesting virtual machine. As another example, the table walker can determine if a read/write permission (or a value representing read/write permission) for the entry matches a type of the memory access. When the acquired information indicates that the virtual machine does not have access to the page (step 904), the table walker determines that the virtual machine does not have access to the page (step 906).

When the acquired information indicates that the virtual machine has access to the page (step 904), the table walker determines if the acquired information indicates that the page has been accessed (step 908). For example, the table walker can determine if the access indicator from the acquired information is set to a specified value, such as 1, indicating that the page has been accessed. When the page has been accessed (e.g., when the memory operation is not the first access of the corresponding page by the virtual machine), the table walker determines that the virtual machine has access to the page (step 910). In other words, if the information from the entry in reverse map table 228 indicates that at least one prior access was made of the page by the virtual machine, the table walker determines that the virtual machine has access to the page. Recall that the access indicator is set to a value indicating that the page has not been accessed each time that the hypervisor updates the entry (via the RMT_UPDATE operation), thereby indicating that the mapping from guest physical address to system physical address has changed. Because the access indicator shows that the page has been accessed, therefore, it is known that the hypervisor has not changed the entry. Because it is also known that the virtual machine has access (from step 904), it is known to be safe to allow the translation from guest physical address to system physical address to be used.

When the acquired information indicates that the page has not been accessed, the table walker determines if the guest accessed pages table indicator for the page has matching access information (step 912). More specifically, the table walker verifies that both the reverse map table and the guest accessed pages table indicate that the page has not been accessed. As described above, a mismatch in these values indicates that the hypervisor (and/or another entity) has updated the entry in reverse map table 228 and the mapping may longer be trustworthy. When a mismatch occurs, therefore, the table walker determines that the virtual machine does not have access to the page (step 906).

When the guest accessed pages table indicator for the page matches the access indicator from the entry in indicating that the page has not been accessed (step 912), the table walker determines that the virtual machine has access to the page (step 910).

In the described embodiments, when both the guest accessed pages table indicator for the page and the access indicator from the entry indicate that the page has not been accessed, and an access of the page is to be performed by the processor for the virtual machine (i.e., along with the operations in FIGS. 8-9), the table walker (and/or another entity) sets the guest accessed pages table indicator for the page and the access indicator in the entry in reverse map table 228 to a value (e.g., 1) indicating that the page has been accessed. In this way, the table walker (or the other entity) records that the page has been accessed.

Returning to FIG. 8, when the virtual machine does not have access to the corresponding page (step 806), the table walker terminates the translation from the guest physical address to the system physical address (step 808). For example, the table walker may assert a fault, and/or otherwise terminate the translating and may not provide the system physical address to the processor. Otherwise, when the virtual machine has access to the corresponding page (step 806), the table walker completes the translation from the guest physical address to the system physical address (step 810). Completing the translation includes providing the system physical address to the processor, where the system physical address may be used for accessing memory, etc. The processor may also cache the returned virtual address to physical address translation (i.e., the virtual address to system physical address translation) in a TLB for subsequent lookups.

The above-described checking operations ensure that two rules are followed for pages that are allocated to a particular virtual machine (e.g., not shared). The first rule is that each page in memory is associated with only one guest address at a time. This rule is enforced during steps 902-904 above. The second rule is that an in-use page that is allocated only to a particular virtual machine should not be remapped by the hypervisor without the virtual machine being involved. This rule is enforced by using the above-described RMT_UPDATE operation in FIG. 6 and the checks of reverse map table 228 and guest accessed pages table 230 in steps 908-912.

Shared Pages

In some embodiments, pages in memory can be shared by two or more virtual machines. In other words, individual pages may be accessible by two or more virtual machines. For example, pages that include program code from common libraries (stdlib.h, etc.), applications, kernel routines, etc. may be shared. As another example, pages of data that are to be read by virtual machines may be shared. In some embodiments, shared pages may be globally shared pages, in that the pages are commonly used and therefore shareable by at least some, and possibly all, virtual machines. In these embodiments, the computing device uses various mechanisms for controlling access to shared pages. For example, in some embodiments, the globally shared page indicator in an entry for the page in reverse map table 228 may be set to a specified value (e.g., 1) to indicate that the page is shared. In some embodiments, shared pages are encrypted with a key that is shared between all of the virtual machines (or at least between virtual machines that are permitted shared access to the page).

In some embodiments, only certain types of accesses are permitted for shared pages. For example, writes may be impermissible for shared pages. During the above-described check of the reverse map table 228 and the guest accessed pages table 230 (step 806), in some embodiments, the system performs one or more checks to ensure that impermissible memory accesses (such as writes) are not being performed. In these embodiments, the table walker may determine that the virtual machine does not have access to the page when the memory access is impermissible for a shared page.

Encrypted Pages

In some embodiments, pages in memory that are allocated to a given virtual machine are encrypted using a key specific to the given virtual machine (as a security measure). In these embodiments, virtual machines may include an indicator associated with each page that shows whether the corresponding page is encrypted. In some embodiments, the above-described checks of reverse map table 228 and guest accessed pages table 230 are not performed for unencrypted pages (as these pages may be generally presumed to be unsecure/untrustworthy). Shared pages may be unencrypted and/or encrypted using a key known to all virtual machines.

Enabling/Disabling Checks of the Reverse Map Table and Guest Accessed Pages Table In some embodiments, a hardware or software switch is available for enabling and disabling the above-described checks of reverse map table 228 and guest accessed pages table 230. For example, each virtual machine may be provided with a flag in software, a register, etc. that can have a specified value (e.g., 1) written to the flag, register, etc. to enable the above-described checks. In these embodiments, when the flag, register, etc. is set to another value (e.g., 0), the checks are not performed.

Checks for Entities Other than Virtual Machines

Although embodiments are described above in which virtual machines are allocated pages, in some embodiments, entities other than virtual machines are protected from malicious page remapping in similar ways. For example, an input-output memory management unit may perform similar checks for tables associated with peripheral devices. Generally, the described embodiments are operable with any entity in the computing device.

In some embodiments, a computing device (e.g., computing device 200 in FIG. 2 and/or some portion thereof) uses code and/or data stored on a non-transitory computer-readable storage medium to perform some or all of the operations herein described. More specifically, the computing device reads the code and/or data from the computer-readable storage medium and executes the code and/or uses the data when performing the described operations.

A computer-readable storage medium can be any device or medium or combination thereof that stores code and/or data for use by a computing device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs).

In some embodiments, one or more hardware modules are configured to perform the operations herein described. For example, the hardware modules can include, but are not limited to, one or more processors/cores/central processing units (CPUs), application-specific integrated circuit (ASIC) chips, field-programmable gate arrays (FPGAs), caches/cache controllers, memory management units, compute units, embedded processors, graphics processors (GPUs)/graphics cores, pipelines, Accelerated Processing Units (APUs), and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In some embodiments, a data structure representative of some or all of the structures and mechanisms described herein (e.g., computing device 100 and/or some portion thereof) is stored on a non-transitory computer-readable storage medium that includes a database or other data structure which can be read by a computing device and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates/circuit elements from a synthesis library that represent the functionality of the hardware comprising the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In this description, functional blocks may be referred to in describing some embodiments. Generally, functional blocks include one or more interrelated circuits that perform the described operations. In some embodiments, the circuits in a functional block include circuits that execute program code (e.g., microcode, firmware, applications, etc.) to perform the described operations.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for handling memory accesses by virtual machines in a computing device, the computing device including a reverse map table (RMT) and a separate guest accessed pages table (GAPT) for each virtual machine, the RMT including a plurality of entries, each entry including information for identifying a virtual machine that is permitted to access an associated page of data in a memory, and each GAPT including a record of pages being accessed by a corresponding virtual machine, the method comprising:
   receiving, in a table walker, a request to translate a virtual address to a system physical address, the request originating from a given virtual machine;
   acquiring, from a corresponding guest page table, a guest physical address associated with the virtual address, and, from a nested page table, a system physical address associated with the virtual address;
   checking, based on the guest physical address and the system physical address, at least one of the RMT and a corresponding GAPT to determine whether the given virtual machine has access to a corresponding page; and
   when the given virtual machine does not have access to the corresponding page, terminating translating the virtual address to the system physical address.

2. The method of claim 1, wherein checking the at least one of the RMT and the corresponding GAPT comprises:
   when an entry in the RMT corresponding to the system physical address includes information indicating that the given virtual machine does not have access to the corresponding page, determining that the given virtual machine does not have access to the corresponding page; and
   when the entry in the RMT includes information indicating that the given virtual machine has access to the corresponding page,
      when page-access information in the entry in the RMT indicates that the corresponding page has not been accessed and page-access information for the corresponding page in the corresponding GAPT indicates that the corresponding page has been accessed, determining that the given virtual machine does not have access to the corresponding page; and
      when page-access information in both the entry in the RMT and for the corresponding page in the corresponding GAPT indicates that the corresponding page has not been accessed, determining that the given virtual machine has access to the corresponding page.

3. The method of claim 2, wherein the entry in the RMT includes information indicating that the given virtual machine does not have access to the corresponding page when at least one of the following is true:
   the entry in the RMT is not marked as valid; and
   a recorded guest physical address in the entry in the RMT does not match the guest physical address.

4. The method of claim 3, wherein the entry in the RMT further includes information indicating that the given virtual machine does not have access to the corresponding page when at least one of the following is true:
   a recorded virtual machine identifier in the entry in the RMT does not match an identifier for the given virtual machine;
   a recorded page size in the entry in the RMT does not match a page size associated with the system physical address; and
   a recorded read/write permission in the entry in the RMT does not match a read/write type of the memory access.

5. The method of claim 2, further comprising:
   receiving a request to update an entry in the RMT;
   terminating the request when a conflict will occur with information in another entry in the RMT;
   when the entry in the RMT is marked as valid, flushing one or more corresponding translation lookaside buffers; and
   updating the entry in the RMT, the updating comprising setting page-access information in the entry in the RMT to indicate that the corresponding page has not been accessed.

6. The method of claim 2, further comprising:
   receiving a request from the given virtual machine to clear, in the corresponding GAPT, page-access information for a given page at a given guest physical address;
   confirming that a corresponding record in the RMT exists and is a candidate for clearing page-access information; and
   clearing page-access information for the given page in the corresponding GAPT and the RMT.

7. The method of claim 2, wherein:
   one or more pages are globally shared pages to which access can be shared between two or more virtual machines, and the corresponding page is a globally shared page; and
   the entry in the RMT includes information indicating that the given virtual machine does not have access to the corresponding page when the entry in the RMT indicates that the corresponding page is globally shared and the memory access is an impermissible memory access for a shared page.

8. The method of claim 1, further comprising:
blocking, for a hypervisor executed by the computing device, direct access to the RMT and the GAPTs;
wherein the blocking comprises at least one of:
encrypting one or both of the RMT and the GAPTs; and
storing one or both of the RMT and the GAPTs in corresponding areas of memory not directly accessible to the hypervisor.

9. The method of claim 1, further comprising:
when the given virtual machine has access to the corresponding page, completing translating the virtual address to the system physical address, the completing comprising returning the system physical address in response to the request.

10. The method of claim 9, further comprising:
determining, without checking the at least one of the RMT and the corresponding GAPT, that the given virtual machine has access to the corresponding page when the corresponding page is shared.

11. A computing device that handles memory accesses by virtual machines, the computing device comprising:
a processor;
a hardware table walker; and
a memory storing a reverse map table (RMT) and a separate guest accessed pages table (GAPT) for each virtual machine, wherein the RMT comprises a plurality of entries, each entry including information for identifying a virtual machine that is permitted to access an associated page of data in a memory, and wherein each GAPT comprises a record of pages being accessed by a corresponding virtual machine;
wherein the table walker is configured to:
receive a request to translate a virtual address to a system physical address, the request originating from a given virtual machine;
acquire, from a corresponding guest page table, a guest physical address associated with the virtual address, and, from a nested page table, a system physical address associated with the virtual address;
check, based on the guest physical address and the system physical address, at least one of the RMT and a corresponding GAPT to determine whether the given virtual machine has access to a corresponding page; and
when the given virtual machine does not have access to the corresponding page, terminate translating the virtual address to the system physical address.

12. The computing device of claim 11, wherein checking the at least one of the RMT and the corresponding GAPT comprises:
when an entry in the RMT corresponding to the system physical address includes information indicating that the given virtual machine does not have access to the corresponding page, determining that the given virtual machine does not have access to the corresponding page; and
when the entry in the RMT includes information indicating that the given virtual machine has access to the corresponding page,
when page-access information in the entry in the RMT indicates that the corresponding page has not been accessed and page-access information for the corresponding page in the corresponding GAPT indicates that the corresponding page has been accessed, determining that the given virtual machine does not have access to the corresponding page; and
when page-access information in both the entry in the RMT and for the corresponding page in the corresponding GAPT indicates that the corresponding page has not been accessed, determining that the given virtual machine has access to the corresponding page.

13. The computing device of claim 12, wherein the entry in the RMT includes information indicating that the given virtual machine does not have access to the corresponding page when at least one of the following is true:
the entry in the RMT is not marked as valid; and
a recorded guest physical address in the entry in the RMT does not match the guest physical address.

14. The computing device of claim 13, wherein the entry in the RMT further includes information indicating that the given virtual machine does not have access to the corresponding page when at least one of the following is true:
a recorded virtual machine identifier in the entry in the RMT does not match an identifier for the given virtual machine;
a recorded page size in the entry in the RMT does not match a page size associated with the system physical address; and
a recorded read/write permission in the entry in the RMT does not match a read/write type of the memory access.

15. The computing device of claim 12, wherein the processor is configured to:
receive a request to update an entry in the RMT;
terminate the request when a conflict will occur with information in another entry in the RMT;
when the entry in the RMT is marked as valid, flush one or more corresponding translation lookaside buffers; and
update the entry in the RMT, the updating comprising setting page-access information in the entry in the RMT to indicate that the corresponding page has not been accessed.

16. The computing device of claim 12, wherein the processor is configured to:
receive a request from the given virtual machine to clear, in the corresponding GAPT, page-access information for a given page at a given guest physical address;
confirm that a corresponding record in the RMT exists and is a candidate for clearing page-access information; and
clear page-access information for the given page in the corresponding GAPT and the RMT.

17. The computing device of claim 12, wherein one or more pages are globally shared pages that are shared between two or more virtual machines, wherein the corresponding page is a globally shared page; and
wherein the entry in the RMT includes information indicating that the given virtual machine does not have access to the corresponding page when the entry in the RMT indicates that the corresponding page is globally shared and the memory access is an impermissible memory access for a shared page.

18. The computing device of claim 11, wherein the table walker is further configured to:
when the given virtual machine has access to the corresponding page, completing translating the virtual address to the system physical address, the completing comprising returning the system physical address in response to the request.

19. The computing device of claim 18, wherein the table walker is further configured to:
    determine, without checking the at least one of the RMT and the corresponding GAPT, that the given virtual machine has access to the corresponding page when the corresponding page is shared.

* * * * *